April 8, 1930.  H. JUNKERS  1,753,706

UNIT FOR ASSEMBLING LATTICE WORK

Filed May 28, 1929  2 Sheets-Sheet 1

Inventor:
Hugo Junkers
by K̲e̲u̲n̲b̲e̲t̲u̲i̲
Atty.

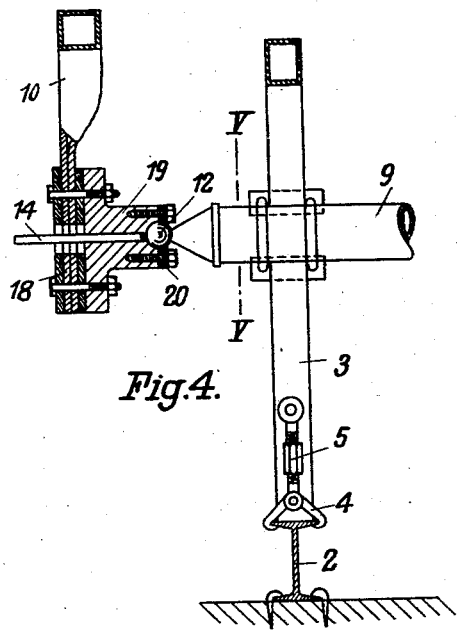
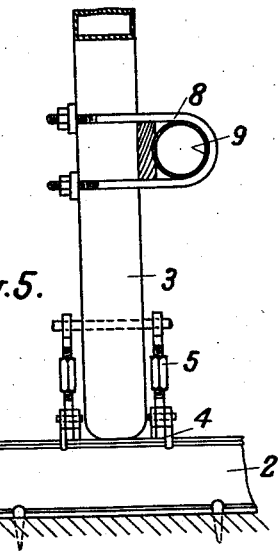
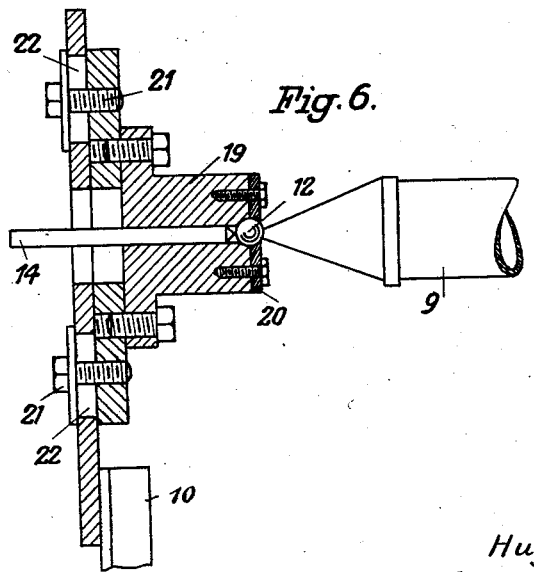

Patented Apr. 8, 1930

1,753,706

UNITED STATES PATENT OFFICE

HUGO JUNKERS, OF DESSAU, GERMANY

UNIT FOR ASSEMBLING LATTICE WORK

Application filed May 28, 1929, Serial No. 366,633, and in Germany June 5, 1928.

My invention relates to assembly units, and more particularly to units for assembling lattice work or like structures, such as wing spars and the like for airplanes. It is an object of my invention to provide an assembly unit which is both simple and adaptable. To attain this end I design the erecting stage and the templets as separate and independent units.

Assembly units for airplanes and the like as heretofore designed, which are a combination of an erecting stage and a templet, are very heavy for constructions of considerable size, and moreover, as they are equipped with fixed supports for the structural members in accordance with the templet or templets forming part of the units, they are only suitable for quite a definite construction and cannot be adapted to other constructions, or if thus adapted, require considerable reconstruction.

According to my invention the templets for fixing the principal members of the construction in a definite relative position are not parts of the erecting stage, but independent units which are made separately and, instead of supporting the members of the construction, are supported by such members which in turn are held in place on the erecting stage. The members of the erecting stage are adapted to be placed in any suitable position, and to be fixed therein. In this manner a rugged and preferably stationary erecting stage is provided which may be adapted to any desired construction by varying the relative position of its parts, and the erecting stage is combined with readily exchangeable templets to make up an assembly unit. The templets may be light, cheap and readily made frames of plane lattice work. They may be comparatively flimsy, as they do not contribute to any appreciable extent to the strength of the assembly unit, for which strength the rigid connection of the members of the construction with the erecting stage is principally relied on. Slight variations in the position of the members which are set by the templets may be considered by making adjustable the sockets or the like by which the templets engage the members.

In order to obviate any inaccuracies due to the flimsiness of the templets, means such as gauges, sighting tubes and the like may be provided, preferably at the templets themselves, for ascertaining the correct position of the members.

In the drawings affixed to this specification and forming part thereof an assembly unit embodying my invention and some details thereof are illustrated diagrammatically by way of example.

In the drawings

Fig. 4 is partly sectional elevation showing one of the pillars of the erecting stage and part of a templet in position on the end of a member secured to the pillar, drawn to a larger scale.

Fig. 5 is a section on the line V—V in Fig. 4 and

Fig. 6 is a section, drawn to a still larger scale, showing an adjustable socket on a templet.

Figure 1:
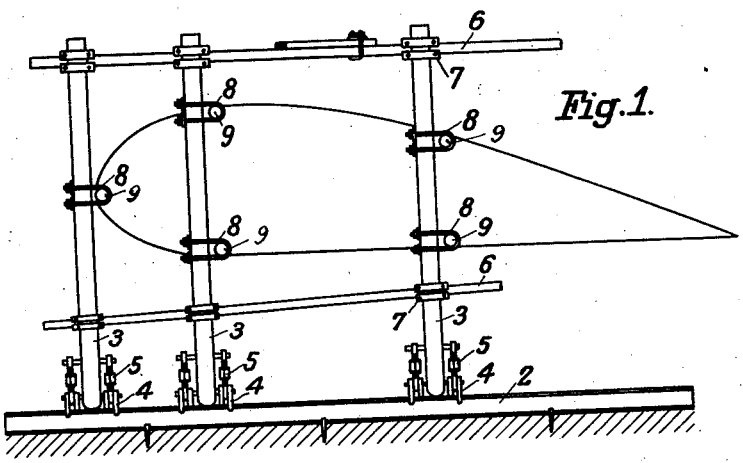
Fig. 1 is an elevation of an assembly unit for assembling the spars of an airplane wing.
Figure 2:
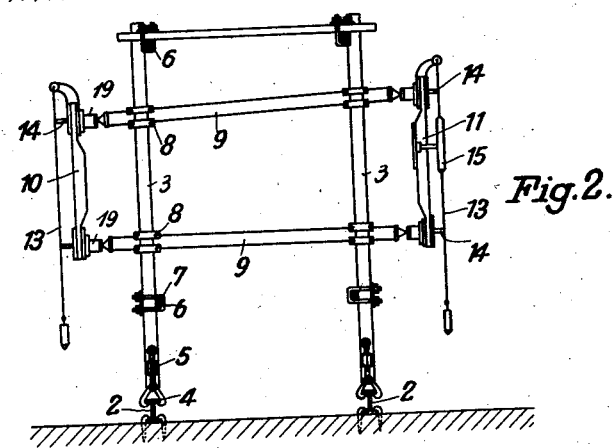
Fig. 2 is an end elevation of the unit, viewed from the right in Fig. 1.
Figure 3:
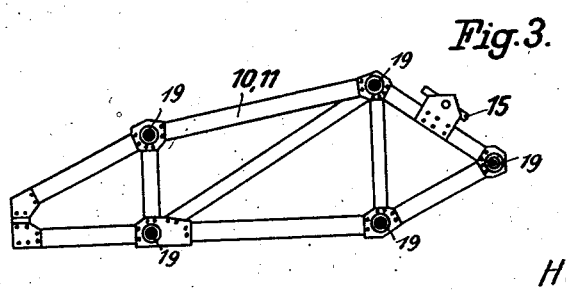
Fig. 3 is an elevation of one of the templets.

Referring now to the drawings, and first to Figs. 1 to 3, 9, 9 are the five spars of a wing the section of which is indicated in Fig. 1, 3, 3 are the pillars of the erecting stage, 8 are clips by which the spars 9 are secured to the pillars 3, 6 are traverse members by which the pillars are fixed in any suitable relative position, in parallel as shown, or inclined, as required, and 7 are clips connecting the pillars and the traverse members. As will appear from Fig. 2, the erecting stage comprises two parallel frames each having three pillars 3, the frames being stationed on parallel rails 2, 2 and held on the rails by clips 5 with hooks 4. Templets 10 and 11 at either end of the spars make up the assembly unit. Each templet, as shown in Fig. 3, is built up from plane lattice members with sockets 19 at the joints in which the ends of the spars 9 are inserted. Each templet is equipped with a perpendicular 13, a gauge 14 for each socket 19 adapted to cooperate with the perpendicular, and a sighting tube 15 which is fitted to rock on the templet.

It will appear that the templets 10, 11 merely serve for determining the correct position of the spars 9, 9 and are supported, together with the spars, by the pillars 3 and traverses 6, but do not take any appreciable percentage of the load.

Referring now to Figs. 4 and 5, 18 is one of the joints of the templet 10 which is here shown as built up from tubular bars, and the adjacent pillar 3 is also tubular, 19 is one of the sockets, which has a hemispherical seat for the reception of a ball 12 at the end of the tubular spar 9, 20 is a plate secured to the socket 19 and holding the ball 12 in its seat, and 14 is one of the gauges which is fitted to slide in the socket and to engage the ball 12 at one end, its other end projecting from the templet on the outside, and, in combination with the gauges of the other sockets, serving as a mark for the sighting tube 15. If the spars are in the proper position, the ends of all gauges 14 must be in the plane in which the tube 15 is rockable.

Referring now to Fig. 6 this shows a socket 19 which is adjustably secured at one of the joints of the templet 10, 22 being a slotted plate on the templet and 21 being screws inserted in the slots and holding the socket 19 with its flange on the plate 22. By adjusting the sockets it is possible to use the same templet for spars the relative position of which is varied to some extent.

In operation the spars 9, 9 are secured on the pillars 3, 3 of the stage by the clips 8 but so as to be free to be displaced on the pillars so that the balls 12 at the ends of the spars can readily be inserted in the sockets 19 of the templets. After the templets have been placed in position they are set vertically by means of the perpendiculars 13, if necessary, with the assistance of the gauges 14. Then the exact position of the ends of the gauges, or other marks, as the case may be, is tested by means of the sighting tube 15. If required the gauges are aligned by displacing the spars in the erecting stage until all gauges or marks of both templets are exactly in vertical planes. The clips 5, 7 and 8 are now set firmly to hold the spars in the given position. Other parts of the construction may now be secured to the spars.

It is understood that I may proceed in the manner described for building up any construction and that I am not limited to lattice work nor to wings or other parts of airplanes.

I wish it to be understood that I do not desire to be limited to the exact details of construction shown and described for obvious modifications will occur to a person skilled in the art.

I claim:—

1. A unit for assembling lattice work comprising an erecting stage, means for securing members of said work to said stage, and an independent templet adapted to be fitted to said members.

2. A unit for assembling lattice work comprising an erecting stage, means for securing members of said work to said stage, and an independent templet of plane lattice work adapted to be fitted to said members.

3. A unit for assembling lattic work comprising an erecting stage, means for securing members of said work to said stage, an independent templet adapted to be fitted to said members, and adjustable sockets on said templet adapted to engage said members.

4. A unit for assembling lattice work comprising an erecting stage, means for securing members of said work to said stage, an independent templet adapted to be fitted to said members, a gauge in said templet for each member adapted to be displaced so as to engage the end of said member, and means on said templet for checking the proper position of said gauges.

5. A unit for assembling lattice work comprising an erecting stage, means for securing members of said work to said stage, an independent templet adapted to be fitted to said members, a gauge in said templet for each member adapted to be displaced so as to engage the end of said member, and a sighting tube on said templet for checking the proper position of said gauges.

6. The method of erecting lattice work comprising securing members of said work to an erecting stage, applying an independent templet to said members, and shifting their position on said stage so as to fit said templet In testimony whereof I affix my signature.

HUGO JUNKERS.